April 23, 1940.                C. G. VOKES                 2,198,190
                                 FILTER
                            Filed Nov. 2, 1937
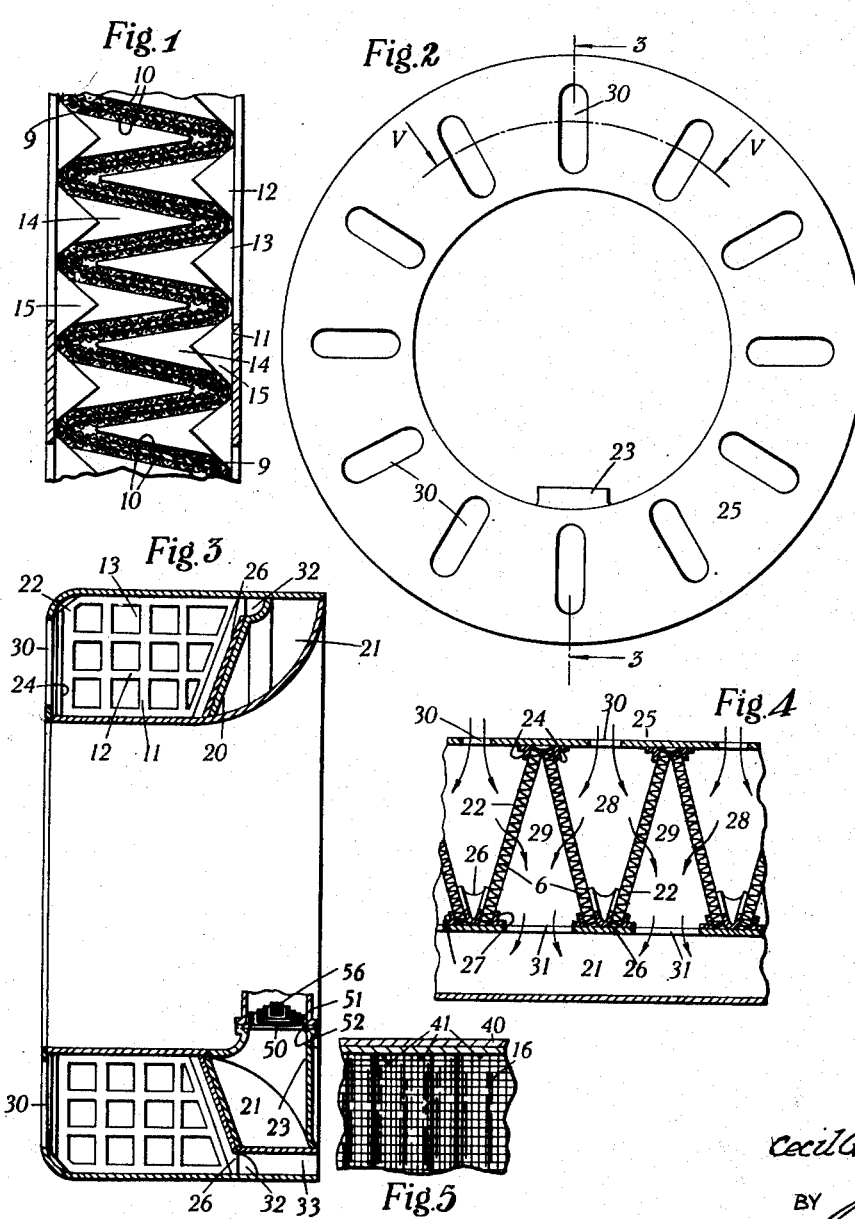
INVENTOR
Cecil G. Vokes
BY
ATTORNEY Patented Apr. 23, 1940

2,198,190

UNITED STATES PATENT OFFICE 2,198,190

FILTER

Cecil Gordon Vokes, London, England

Application November 2, 1937, Serial No. 172,455
In Great Britain May 7, 1937

6 Claims. (Cl. 183—71)

The invention relates to filters and to the installation of air-filtering means in aircraft.

It is an object of the invention to provide an improved form of filter comprising a pleated filter element secured within a casing.

It is also an object of the invention to provide an air-cleaning installation for aircraft comprising a filter element and means to supply air to an engine of the aircraft by way of the filter element at a pressure dependent upon the speed of the aircraft.

It is still further an object to provide, in an air-cleaning installation as just described, means for dealing with rain and other foreign matter entering the scoop.

Yet a further object of the invention is the provision in a cowling for a radial engine, of a filter element and a passage for the reception of air which has passed through the filter element.

With the above and other objects in view, the invention consists in the improved combinations and arrangements contained in the embodiments now to be described in detail, and features of which are set out in the claims which follow.

In the drawing—

Figure 1 is a section through part of a filter panel in accordance with the invention, Figure 2 is a front view of a cowling for a radial engine incorporating an air filter installation in accordance with the invention, Figure 3 is a section on the line IV—IV of Figure 2, Figure 4 is a section on the line V—V of Figure 2, Figure 5 is a view partly in section of a detail of the filter panel shown in Figure 1.

The filter panel is illustrated in Fig. 1 and comprises a filter element 6 enclosed within a casing of fibre-board, cardboard or the like.

The filter element 6, which comprises a layer 9 of filter material, such as cellulose wadding, between two layers 10, 10 of buckram or other gauze, is folded to form a number of V-shaped pockets or pleats which are of considerable length in relation to the rigidity of the element.

The casing of the panel is formed from sheets of fibreboard or the like cut, bent and secured together to form a box-like structure having channel-like edge members connected by horizontal and vertical spacing portions which provide a number of substantially rectangular openings in the opposite faces of the structure. In Fig. 2 spacing portions, one in section and the other in elevation, appear at 11 and 12, whilst one of the openings just referred to is indicated at 13.

The correct shape and spacing of the pleats in the filter element 6 are maintained by tongues 14 bent from the edges of strips of fibre-board which are carried by spacing portions of the box-like structure. These tongues are reinforced at their bases by triangular tongues 15 which are bent from the edges of metal strips which are interposed between the fibre-board strips and the associated spacing portions. Small tongues (not shown) bent up from the opposite faces of the metal strips are pressed through the fibre-board strips and the spacing portions of the box-like structure respectively, and bent over, the various strips (fibre-board and metal) being thereby secured to the associated spacing portions of the box-like structure.

The tongued fibre-board strips are secured to the inner faces of the spacing portions on both sides of the structure, so that adjacent pockets in the filter element are entered by spacing tongues from opposite sides of the structure.

At the edges of the panel, the pleated filter element 6 is secured to the channel-like members by means of adhesive. Thus, as indicated, in Figure 6, the ends of the element are secured to the cardboard end members 40 by means of alhesive applied as at 41.

The filter panel can be of any convenient shape, as to the figure defined by the channel-like edge members, and can thus be so shaped as to correspond to the outline of the fuselage or of the space in which it is housed or shaped to avoid adjacent structural members or accessories.

The filter panel just described is very light, but has yet the requisite rigidity. The pleating of the filter element gives a very large filter area in relation to the bulk of the panel.

If, required, the panel can be easily removed and replaced by a new panel or it can be easily cleaned, for example by means of a high-suction vacuum cleaner the nozzle of which is applied in turn to the substantially rectangular openings formed by the spacing portions of the box-like structure.

Although, in Fig. 1, the pleats of the filter element 6 are represented as running laterally of the aircraft, they might instead run in the fore and aft direction. In general, they will run in the direction of the largest dimension of the panel but, whenever possible, it is preferred that they should run vertically to make the filter to some extent self-cleaning in that foreign matter shaken from the element by vibration falls to the bottom. Thus, where instead of installing a single panel in the bottom of the fuselage or nacelle as in Fig. 1, a panel is arranged at each side of the fuselage or nacelle, the pleats of the filter elements will be arranged vertically or perhaps inclined both to the horizontal and the vertical.

Instead of passing directly to the carburettor intake as described, the air delivered to the filter panel by the scoop 4 may pass through the filter element into the space within the fuselage or other part of the aircraft in which the engine is housed, all ways of access for air to the space being provided with filtering means, so that the engine can suck in none other than filtered air. Thus, the passage 7 may deliver into the space in which the engine is housed, or it may be omitted altogether.

Figures 2, 3 and 4 illustrate the installation of air filtering means mounted in a casing formed by a cowling ring for a radial aero engine.

As shown, the cowling provides an enclosed annular space which is divided into two portions, a larger forward portion and a smaller rear portion, by a partition wall 20. The rear portion, indicated by the numeral 21, forms a common collector space for air which has passed through the filter elements 6 of the filter panels 22 which are arranged in the forward portion of the annular space. The rear portion 21 has an outlet 23 by way of which the air thus collected may pass to the air intake of the carburettor or carburettors.

As shown by Fig. 4, the filter panels 22 are arranged so that spaces of substantial V-section are formed between adjacent panels, the forward edges of pairs of adjacent panels being held together in position by pairs of clips 24 of angular section carried by the front wall 25 of the cowling. At the rear, the edges of adjacent panels are separated by members 26 of V-shaped section which are carried by the wall 20. Angular clips 27 similar to the clips 24 keep the rear edges of the panels in contact with the members 26.

Referring to Fig. 4, the spaces of substantial V-section formed between adjacent filter panels are alternately wider at the front and the back, such spaces being designated 28 and 29 respectively, apertures 30 provided in the front wall 25 communicate with the spaces 28, whilst apertures 31 in the wall 20 communicate with the spaces 29. The arrows in the drawing show how air is thus able to enter by way of the apertures 30 to pass through the filter elements 6 of the filter panels and the apertures 31 into the collector space 21, whence it is delivered to the carburettor air intake at a pressure dependent upon the speed of the aircraft.

The zig-zag arrangement of the filter panels, in conjunction with the pleated form of the individual filter elements provides a very large filter area in relation to the space occupied.

In order to deal with rain and other foreign matter which enters by way of the apertures 30, the wall slopes rearwardly towards the peripheral portion, which is shaped, as shown in Fig. 2, to form, with the outer wall of the cowling, an annular passage 32 which communicates, at the bottom of the cowling, with a rearwardly, directed outlet passage 33.

The members 26, which follow the rearward slope of the wall 20, are cut away at the outside, as can be seen from Fig. 3, to permit communication between the spaces 28 and the annular passage 32. Rain and other foreign matter striking the members 26 tends to pass outwardly in the radial direction of the cowling, owing to the slope of the members, and thus to enter and traverse the annular passage 32, finally to be discharged into the atmosphere by way of the outlet passage 33.

As is apparent from Fig. 4, the width of the members 26 is approximately equal to that of the apertures 30 so that the majority of the rain and of the heavier solid particles entering through those apertures will pass straight to the members 26 and thus to the passage 32 without coming into contact with the filter element.

Provision must be made, of course, for preventing direct communication between the spaces 29 and the passage 32 in order to prevent the escape of filtered air but chiefly to prevent the contamination of the filtered air by foreign matter.

In the installations shown the swiftly moving air delivered to the filters strikes the filter panels obliquely and has to change direction in passing through the filter elements.

The air has to change direction before and after passing through the filter panels and again on entering the common passage 21. Upon entering the common passage, the air stream has a choice of two paths in opposite directions, so that further turbulence may occur as the result of collision. Finally, oppositely-moving air streams are delivered to the outlet pipe 23 by the common passage 21 and more turbulence may result here.

Installations in accordance with the invention include means for straightening the flow of air which has passed through the filtering means.

As shown in Figure 3 an air flow straightening device 50, which may have the form illustrated by Figure 7, is arranged at the junction between the intake pipe 51 of the carburettor or carburettors and the outlet pipe 23.

Air straightening means 50 is shown in the intake pipe 51 and comprises a spirally wound flat strip 56 within a shell 52 and between the convolutions of which a sinuous or zig-zag strip is wound to form a plurality of small passages which serve to break up the air flow into a number of streams of relatively small cross-section.

I claim:

1. In a cowling for a radial aero engine, a substantially annular compartment arranged to receive air by way of forwardly directed openings, a plurality of filter elements arranged within said compartment to divide it into a plurality of subcompartments and a common passage for the reception of air which has passed through said filter elements.

2. In a cowling for a radial aero engine, a substantially annular compartment arranged to receive air by way of a plurality of forwardly directed openings, a plurality of filter panels arranged in zig-zag formation within said compartment to define paths for air between them, a common passage for the reception of air which has passed through said filter panels, and a common passage for the reception of foreign matter which has been carried past and between said filter panels by air entering said compartment by way of the forwardly-directed openings.

3. An air-filtering installation for an engine installed in an aircraft comprising a casing and a pair of filter panels which are enclosed by said casing and are inclined so as to approach each other toward the rear of the aircraft in the direction of motion thereof, said filter panels being arranged to receive air from a forwardly-facing opening, and a small exit opening being provided in said casing for foreign matter which has entered by the forwardly-facing opening and has passed between the two filter panels.

4. An air-filtering installation for a radial aero-engine comprising a cowling defining an annular space, a plurality of filter panels arranged in zig-zag formation within the annular space defined by said cowling and dividing it into a plurality of compartments, said compartments having forwardly-directed openings whereby air may enter said compartments and pass to said filter panels.

5. An air-filtering installation for a radial aero-engine comprising a cowling defining an annular space, a plurality of filter panels arranged in the annular space to divide it into a number of compartments each of which receives air from a forwardly-directed opening in the wall of said cowling, and partition means within said cowling defining a common collector space for clean air which has passed through said filter panels and a collector space for rain which has entered the compartments by the forwardly-directed openings and has been carried through said compartments past said filter panels.

6. An air-filtering installation for a radial aero-engine comprising a cowling defining an annular space, a plurality of filter panels, each comprising a pleated filter element, arranged within the annular space in zig-zag formation so as to approach each other alternately toward the front and the back of said cowling to form a plurality of compartments, each of which receives air from a forwardly-directed opening in the wall of said cowling, and partition means in said cowling defining a common collector space for clean air which has passed through said filter panels, and a collector space for rain and other foreign matter which has entered by the forwardly-directed openings in the wall of said cowling and has been carried through said compartments past said filter panels.

CECIL GORDON VOKES.